Sept. 15, 1925.

P. F. BUCHANAN

CUP MAKING MACHINE

Filed Jan. 17, 1924   6 Sheets-Sheet 1

Sept. 15, 1925.
P. F. BUCHANAN
CUP MAKING MACHINE
Filed Jan. 17, 1924   6 Sheets-Sheet 6

Inventor
Peter F. Buchanan
by Charles ...
Attys.

Patented Sept. 15, 1925.

1,553,506

UNITED STATES PATENT OFFICE.

PETER F. BUCHANAN, OF LONDON, ONTARIO, CANADA.

CUP-MAKING MACHINE.

Application filed January 17, 1924. Serial No. 686,774.

*To all whom it may concern:*

Be it known that I, PETER F. BUCHANAN, a subject of the King of England, and a resident of the city of London, in the county of Middlesex and Province of Ontario, Dominion of Canada, have invented certain new and useful Improvements in a Cup-Making Machine; and I do hereby declare that the following is a full, clear, and exact description of the same, reference being had to the accompanying drawings, and to the numerals of reference marked thereon, which form a part of this specification.

This invention relates to a cup forming machine for making confectionery containing dishes or the like and is an improvement of the machine disclosed in my pending application, Serial No. 615,843 filed Jan. 20, 1923.

It is primarily an object of this invention to provide improved mechanism for heating the paper as it is fed to the forming dies, and providing a proper feed therefor.

It is a further object of this invention to provide mechanism for receiving the formed cups allowing them to cool and set before ejected therefrom.

It is also an object of this invention to provide an improved form of die that will prevent transverse wrinkling of the cups.

With these and other objects in view which will become more apparent in the following description and disclosures in the drawings, this invention comprises the novel mechanism and combinations hereinafter described and more particularly pointed out and defined in the appended claims.

In the accompanying drawings which illustrate a preferred embodiment of this invention and in which similar reference numerals refer to similar features in the different views

The illustrated machine is susceptible of shearing and simultaneously forming a plurality of paper cups or dishes. In the present machine, eight cups may be simultaneously stamped and formed. To this end, the different strips of paper are led from different supporting reels (not shown) under a tension roll 1 (Fig. 13) slidably mounted in a slotted support 2 extending from a bracket 3 attached to any suitable part of the machine. Two pair of springs 4 which are diagonally arranged urge the roller 1 downwardly. The plurality of strips of paper which pass under the tension roll 1 are led upwardly over a guide roll 5 suitably journalled upon the front end of the machine. From the guide roll 5 the plurality of superposed strips of paper pass onto the feed table 6 and between upper and lower heating units. These heating units may be of any well known type. They should, however, be sufficiently broad to heat the strips of paper throughout their breadth. In the present instance, electrical heating units are shown. The upper heating unit consists of a light sheet metal box 7 or the like in which properly insulated heating coils are adapted to be supported.

Figures 1, 2:
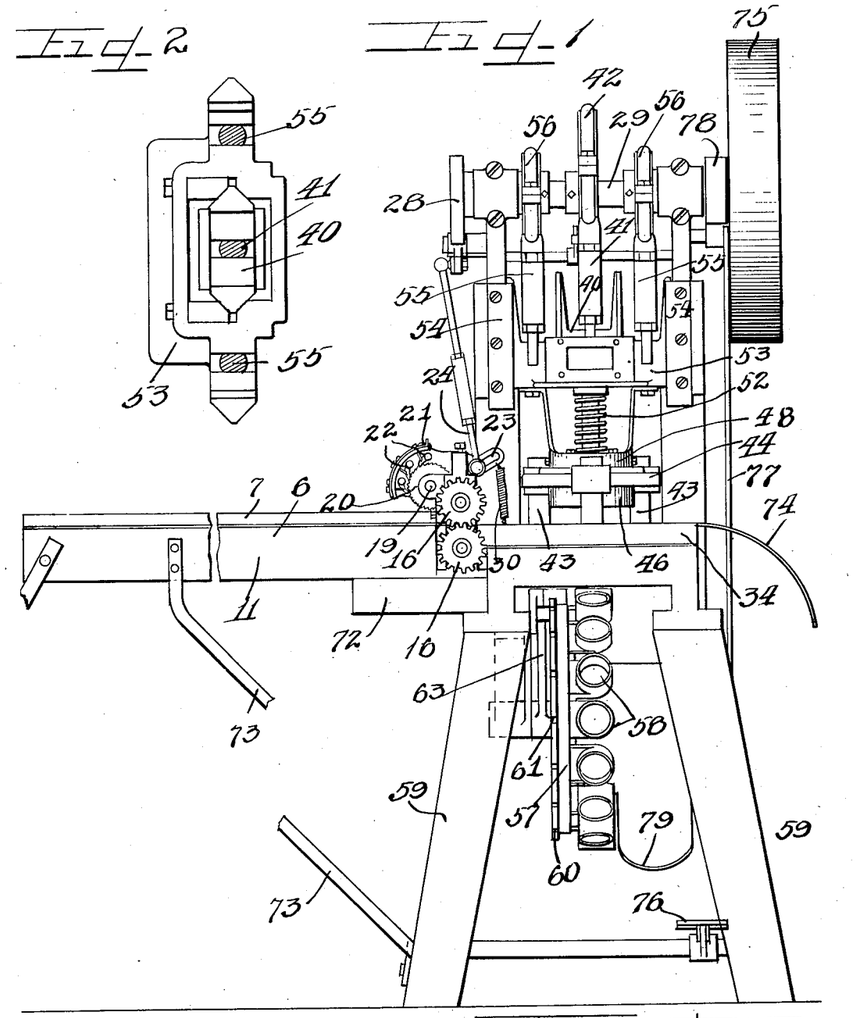
Figure 1 is a front elevational view of the machine.
Figure 2 is an enlarged plan view of the reciprocating cross head with the connecting rods shown in section.
Figures 10, 11, 12:
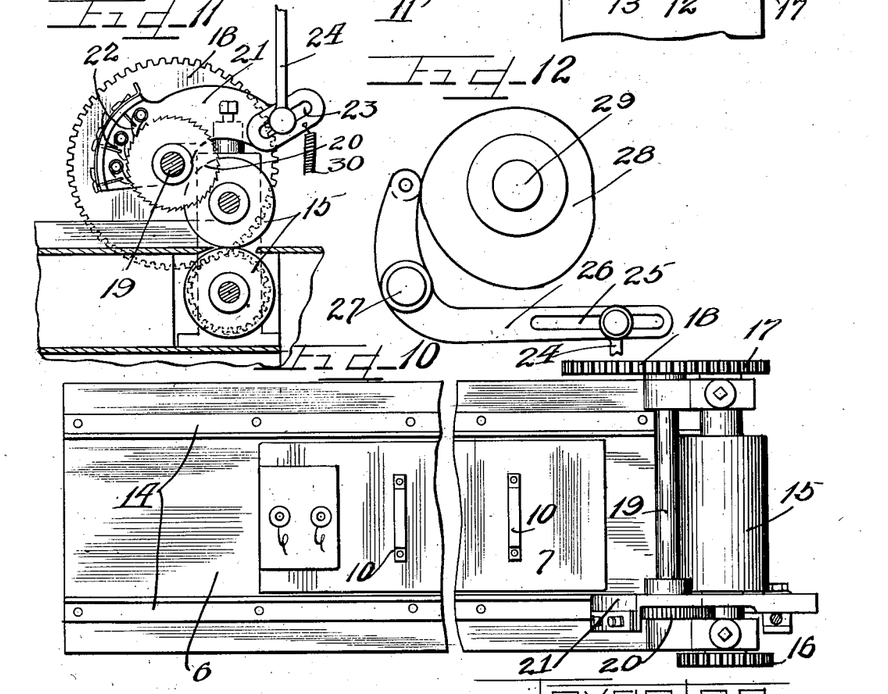
Figure 10 is a top plan view of the heating table.
Figure 11 is an enlarged elevational view of the feeding mechanism showing adjacent parts in section.
Figure 12 is an enlarged elevational view of a part of the operating mechanism for the feed rolls.

The terminals or electrical connections to these coils are shown at 8 and 9. A pair of handles 10 for readily lifting the upper heating unit may be secured thereon. This upper heating unit rests loosely upon the feed table 6, and the plurality of superposed strips of paper are adapted to be drawn therebeneath by a pair of feed rolls as will later appear. Beneath the feed table 6, there is a second sheet metal box 11 or the like which houses a pair of heating coils the terminals of which are shown at 12 and 13. These heating units are designed to properly heat the plurality of superposed strips of paper upon the feed table, which are guided between the angle guides 14 to a pair of feed rolls 15 between which the paper passes to the shearing and forming dies. The feed rolls 15 are suitably journalled upon the front end of the feed table. They are geared together upon one side by the coacting gears 16 (Fig. 1). The lower roller has a gear 17 upon the opposite side which meshes with a gear 18 upon an intermittently operated shaft 19 suitably journalled upon the front end of the feed table. The gear 18 is secured upon one end of the shaft 19, and upon the other end of said shaft there is secured a ratchet wheel 20. A lever 21 is journalled upon the shaft 19, and a plurality of pawls 22 are pivoted upon said lever and spring impelled into engagement with said ratchet wheel. The free end of the lever 21 is provided with an inclined slot 23 in which the lower end of a link 24 is adjustably secured. The upper end of said link is adjustably secured in a slot 25 (Fig. 12) of a cam lever 26 pivotally mounted intermediate its ends by means of a stud 27 to the frame of the machine. The lever 26 is substantially in the form of a bell crank having a roller at its free end adapted to be engaged by a cam 28 secured upon the main operating shaft 29 of the machine. During every rotation of the shaft 29, the feed rolls will be actuated for feeding a plurality of strips to the dies. The weight of the horizontal arm of the lever 26 and the end of the lever 21 will be normally sufficient to return the pawl lever 21 to initial position, and if not sufficient, a common form of return spring 30 may be used.

The female die comprises a hollow cylindrical member 31 which extends through an aperture in a bed plate 32 resting upon the legs or lower frame of the machine. The upper end of the female die has a radial flange 33 which is cut down below the top and which fits in a circular recess of a ring member 34 resting upon the bed plate 32. The upper end of the female die has a slightly downwardly sloping margin of about ⅛ of an inch which terminates at approximately the point 31ª. From the point 31ª to the cylindrical portion of the die the contour is in the form of an arc 31ᵇ which merges into the inclined margin 31ª and the interior cylindrical portion of the female die so that no humps or ridges occur for wrinkling the cups. A cylindrical shearing ring 35 rests upon the radial flange 33 of the female die and is confined in the recess of the ring member 34.

A die 36 in the form of an inverted cup and provided with a radial flange 37 having a lower conical and fluted surface corresponding to the inclined margin 31ª of the female die cooperates with the upper inclined surface of the latter. A plunger rod 38 slidingly extends through the die 36. The lower end of the plunger has a frusto conical fluted head 39 designed to be projected through the female die 31. The upper end of the rod 38 is connected to a yoke 40 which in turn is connected to a reciprocating rod 41 having an eccentric strap 42 surrounding an eccentric upon the main driving shaft 29.

Several guiding posts 43 extend upwardly from the ring 34, and a centrally apertured plate 44 reciprocates upon said guides. This plate 44 has an annular flange 45 extending interiorly of the aperture near the medial part of the wall thereof. A shearing ring 46 is secured in the lower part of the ring 44, and a rubber stripper 47 is positioned around the said shearing ring. This shearing ring 46 is designed to fit within the lower shearing ring 35 for shearing circular blanks of paper from the strips as they are fed in position between the shears. A yoke 48 having a lower cylindrical portion is threaded into the upper part of the plate 44, and a centrally apertured closure 49 is secured in the upper part of the cylindrical portion of the yoke. Guide rods 50 extend from the upper die 36 through the enclosure. A comparatively weak coil spring 51 surrounds the die 36 and is confined between the enclosure 49 and the flange 37 of said die. A stronger coil spring 52 surrounds the plunger rod 38 and is confined between the yoke 40 and an annular shoulder formed upon the top of the die 36 adjacent the bearing for the plunger shaft. During the operation of the machine, these springs act upon the upper die 36 as will later more fully appear.

The upper end of the yoke 48 is connected to the bottom of a reciprocating cross head 53 which slides in lateral guides 54 and which has a central guideway for the yoke 40. The upper part of this cross head is connected to a pair of reciprocating rods 55 which have eccentric straps 56 surrounding eccentrics on the main drive shaft 29.

Figure 5:
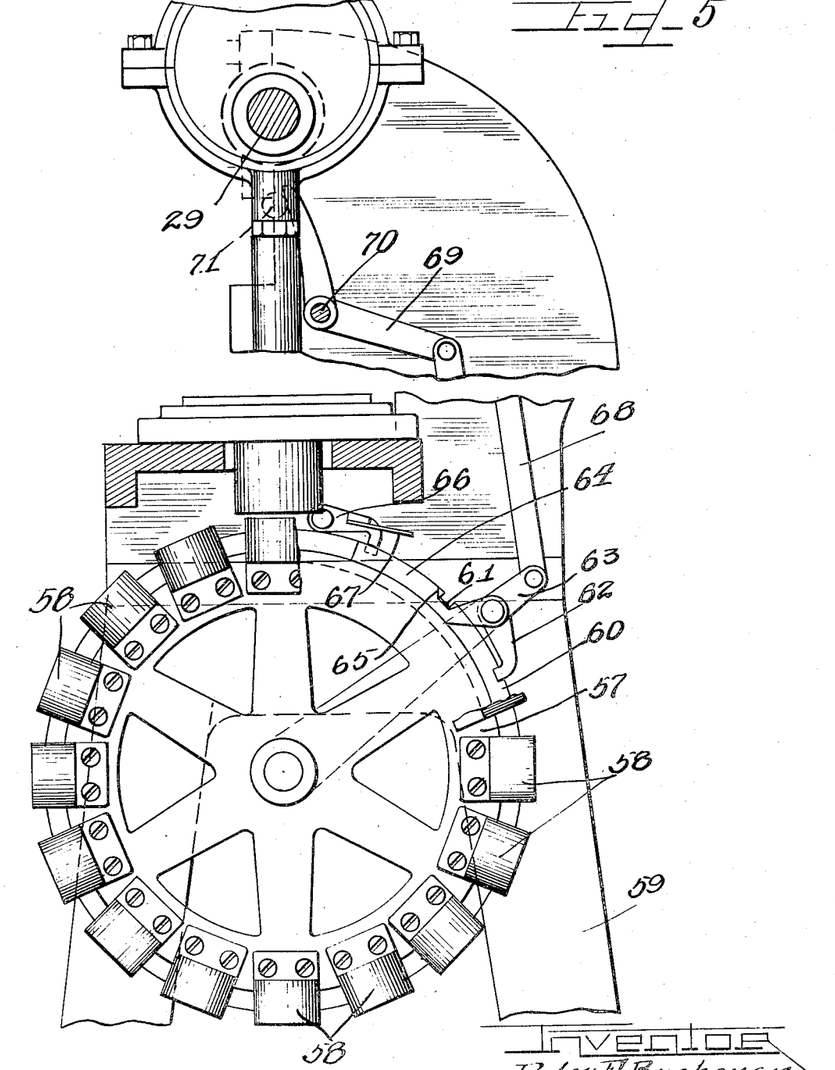
Figure 5 is an enlarged and broken part elevational and part sectional view of the cooling conveyer.
Figures 6, 7, 8:
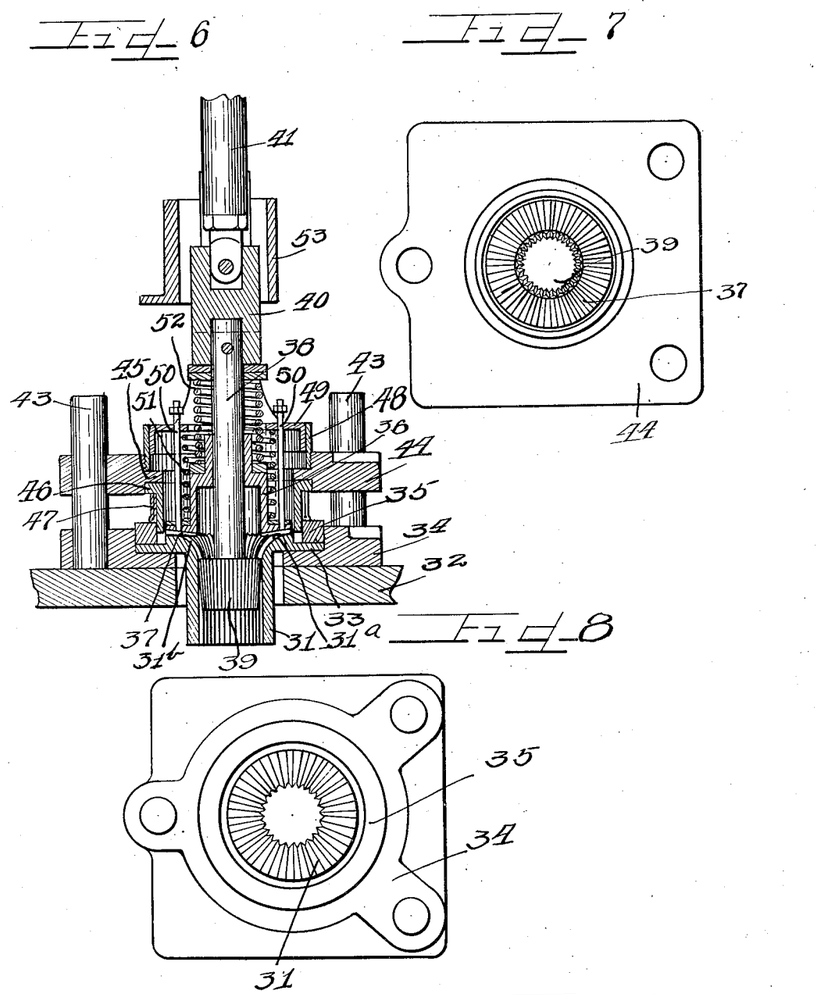
Figure 6 is a fragmentary sectional view of the dies and plungers illustrating the dies in cooperative relation.
Figure 7 is a bottom plan view taken upon the line 7—7 of Figure 4.
Figure 8 is a plan view of the female die and adjacent parts.
Figure 9:
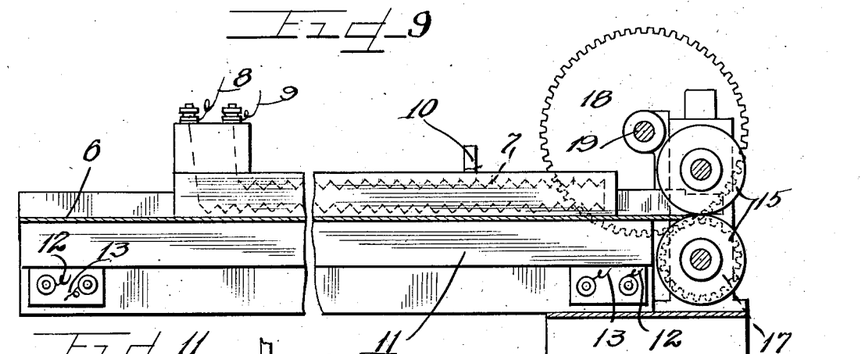
Figure 9 is a sectional view through the feed table showing parts in elevation.

During the operation of the machine a plurality of blanks are simultaneously sheared and then stamped into the female die 31. They are eventually ejected from said die by the second or third lot that are stamped. A conveyer rotates beneath the female die 31 in timed relation with the operation of the machine for receiving the formed cups or dishes. In the present embodiment of this invention this conveyer consists of a rotary wheel 57 best shown in Figures 1 and 5 and comprises a circumferentially extending series of pockets 58 attached to the outer lateral margin thereof. This wheel is supported upon a shaft suitably journalled in the supporting legs 59 of the machine. A ratchet wheel 60 is attached to the conveyer. This ratchet wheel is provided with spaced notches 61 with which an operating pawl 62 is adapted to engage. This pawl is pivoted upon a lever 63 which is journalled coaxially with the rotary conveyer. The pawl 62 is provided with a tail or guard 64 having a bevelled notch 65. A holding pawl 66 is suitably pivoted adjacent the ratchet wheel for engaging the notches and centering and locking the conveyer in set position for receiving the formed cups. The guard 64 is adapted to support the holding pawl 66 out of engagement with the notches 61 of the ratchet when the latter is rotating. However, when the lever 63 swings upwardly until the notch 65 registers with the notch under the holding pawl 66, the latter will be spring impelled to engage the notches 65 and 61, thereby locking the conveyer from rotating. When the lever 63 starts downward to rotate the conveyer, the inclined face of the notch 65 in the guard 64 will elevate the pawl 66 out of engagement with the notches 61 and 65. The pawl 66 is provided with a presser plate 67 extending laterally therefrom over the pockets 58 for the purpose of pressing the cups therein.

The lever 63 is connected to an operating link 68 which in turn is connected to one arm of a bell crank lever 69 pivoted upon a stud 70 extending from a suitable support adjacent the reciprocating rod 41. The other arm of the bell crank 69 is directed upwardly and is spring impelled against a stud 71 upon the reciprocating rod 41, so as said rod is raised it will actuate the bell crank lever 61 and the lever 63 for rotating the conveyer a distance corresponding to that between a pair of pockets. When the rod 41 descends, the spring associated with the bell crank lever 69 will force the upper arm laterally as the descent of the stud 71 permits.

The feed table 6 and heating units may be supported upon a suitable platform 72 extending from the machine and may be braced by struts 73 or in any other way, and the block 34 may be provided with a curved chute 74 for carrying off the waste paper.

Figures 3, 4:
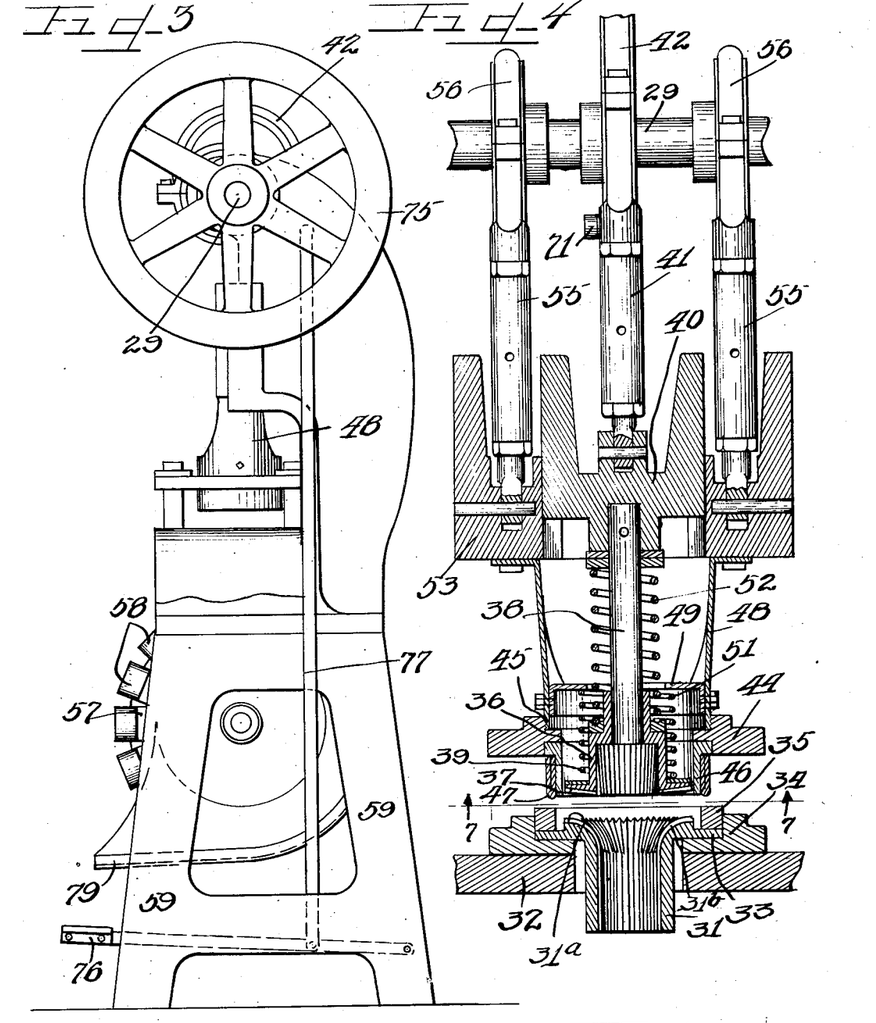
Figure 3 is an end elevational view of the machine.
Figure 4 is an enlarged central section through the machine with parts omitted.
Figures 13, 15:
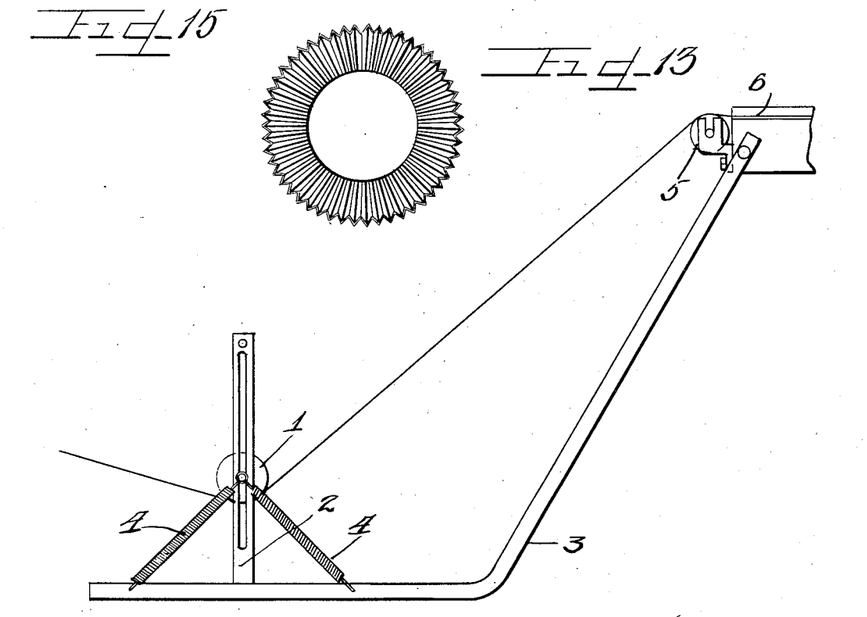
Figure 13 is a side elevational view of the paper supporting mechanism adjacent the supporting rolls.
Figure 15 is a top plan view of the completed cup.
Figure 14:
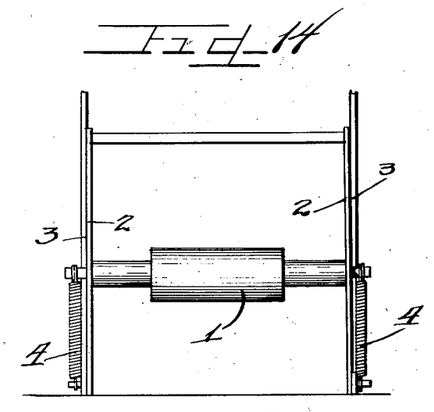
Figure 14 is a fragmentary front elevation thereof.
Figure 16:
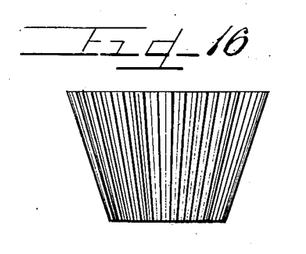
Figure 16 is an elevational view of the completed cup.

A belt pulley 75 may be mounted upon the driving shaft 29 and connected therewith by any suitable clutch which may be operated by a suitable clutch pedal 76 connected by a rod 77 with the clutch 78 diagrammatically shown in Fig. 1. In Figs. 1 and 3 there is shown a chute 79 adapted to catch the finished cups as they are ejected from the conveyer. The cups are first injected into the pockets 58, the conveyer then makes a complete revolution before the cups are ejected. When a second charge of cups is injected in the pockets the first charge will be ejected. This period of time that elapses will allow the cups to cool and set before they are ejected into the chute 79. The completed cup as formed in this machine is fluted or corrugated as shown in Figs. 15 and 16.

*Operation.*

In the operation of the machine, power is applied to the pulley 75 and the clutch is thrown in if it is not already in operative position. The plurality of strips of paper from the different reels which strips are positioned in superposed relation will be assumed to be under the heating unit 7 with the forward ends between the feeding rolls. The heating units will of course heat the strips of paper before they pass through the feeding rolls. As the main drive shaft 29 rotates the cam 28 will actuate the pawl lever 21 for rotating the feed rolls 15 for feeding the plurality of superposed strips between the dies. The dies and shearing ring 46 will then descend, the shearing rings 35 and 46 will cut circular blanks from the strips which will be engaged between the dies 31 and 36 by spring pressure for creasing and holding the outer margin of said blanks. The plunger 39 will then force the blanks into the female die, the blanks slipping out from under the creasing die 36. This operation will form the cups and crease or corrugate the same as shown in Figs. 15 and 16. The plunger 39 will then ascend, leaving the nested cups in the female die. Another cycle of operation will then take place for forming a second charge of cups. As this second charge is forced down into the female die, the first charge will be ejected thereby and injected into one of the pockets 58 of the cooling conveyer 57. During another cycle of operation, the conveyer 57 will be rotated to bring another pocket under the female die, the filled pocket passing under the plate or leveling means 67 for pressing the cups in the pockets 58. After sufficient cycles of operation have been completed, the rotary conveyer will have made a complete revolution bringing the first pocket under the female die. When a second charge of cups is being ejected into the first pocket, the first charge will be ejected into the chute 79 ready for packing. It will accordingly be appreciated that the nested cups remain in the conveyer 57 for a complete revolution allowing sufficient time for the cups to cool and set before they are ejected.

When the die 36 descends, it will corrugate the outer margin of the blanks, which rest upon the inclined margin 31$^a$ of the lower die, and yieldingly hold the same while the plunger 39 descends and forces the blanks into the femal die for completing the corrugation thereof; the blanks being drawn over the arcuate surface 31$^b$ will not wrinkle transversely, since there is an even strain upon the blanks. It will be appreciated that if the surface 31$^b$ were not arcuate and did not properly merge into the inclined margin 31$^a$ of the die 31 and the interior cylindrical portion thereof, an annular ridge or hump might be formed over which the blanks would wrinkle as they were being drawn, as is now the case in most prior art machines.

I am aware that many changes may be made, and numerous details of construction may be varied through a wide range without departing from the principles of this invention, and I therefore do not purpose limiting the patent granted hereon, otherwise than necessitated by the prior art.

I claim:

1. In a paper cup forming machine, the combination with cup forming mechanism, of a movable conveyer having pockets for receiving the formed cups, means for intermittently moving said conveyer and means for levelling the cups in said conveyer, said forming mechanism acting to eject the cups from said conveyer after the latter has travelled a predetermined extent.

2. In a paper cup forming machine, the combination with cup forming mechanism, of an endless conveyer having pockets for receiving the formed cups, means for intermittently rotating said conveyer, said forming mechanism acting to discharge the cups from the conveyer after a complete revolution of the latter.

3. In a paper cup forming machine, the combination with cup forming mechanism comprising a female die in which the cups are formed and then nested during a cycle of operation, a rotating conveyer having pockets for receiving said cups, means for intermittently rotating said conveyer for bringing a pocket beneath said female die for receiving the nested cups, said nested cups being injected into said pocket during the second cycle of operation of said forming mechanism, and said cups being ejected from said conveyer after the same has completed a revolution.

4. In a paper cup forming machine, the combination with cup forming mechanism, of a rotating conveyer for receiving said formed cups, means for intermittently rotating said conveyer, and means for discharging said cups from said conveyer after the same has travelled a predetermined extent.

5. In a paper cup forming machine, the combination with cup forming mechanism, of a rotating conveyer for receiving said formed cups, and means for intermittently rotating said conveyer, said forming mechanism acting to eject the cups from said conveyer after the latter has made one revolution.

6. In a paper cup forming machine, the combination with cup forming mechanism, of a rotary wheel having pockets for receiving the formed cups, and means for intermittently rotating said wheel.

7. In a paper cup forming machine, the combination with cup forming mechanism, comprising a female die and a plunger die, of a rotary wheel having pockets, means for intermittently rotating said wheel to bring said pockets beneath said female die, said plunger operating to force said cups through said female die and into said pockets.

8. In a paper cup forming machine, the combination with cup forming mechanism, of a conveyer having means for receiving the formed cups, means for intermittently operating said conveyer in timed relation with said forming mechanism, a part of said forming mechanism ejecting the cups from said conveyer.

9. In a paper cup forming machine, a female die, a plunger die cooperating therewith, an endless conveyer traveling beneath said female die, means for intermittently operating said conveyer in timed relation with said plunger, said plunger ejecting the formed cups upon said conveyer.

10. In a cup forming machine the combination of forming dies, means for feeding a web of paper to the dies, said dies including a tubular forming die and a plunger adapted to eject formed cups through said tubular die, and a rotatably mounted wheel provided with a plurality of peripheral pockets adapted to be brought into alinement with the tubular die to receive cups ejected therefrom.

11. In a cup forming machine the combination of forming dies, means for feeding a web of paper to the dies, said dies including a tubular forming die and a plunger adapted to eject formed cups through said tubular die, and a plurality of pockets adapted to be brought into and out of alinement with said tubular die to receive cups ejected therefrom.

12. In a cup forming machine the combination of forming dies, means for feeding a web of paper to the dies, said dies including a tubular forming die and a plunger adapted to eject formed cups through said tubular die, and a plurality of pockets mounted to move in a closed orbit, adapted to be brought into and out of alinement with said tubular die to receive cups ejected therefrom.

13. In a cup forming machine the combination of forming dies, means for feeding a web of paper to the dies, said dies including a tubular forming die and a plunger adapted to eject formed cups through the said tubular die, means for heating the paper as it is fed to the dies, and a plurality of pockets adapted to be brought into and out of alinement with said tubular die to receive cups ejected therefrom.

14. In a cup forming machine the combination of forming dies, means for feeding a web of paper to the dies, said dies including a tubular forming die and a plunger adapted to eject formed cups through said tubular die, and a plurality of tubular pockets adapted to be brought into and out of alinement with said tubular die to receive cups ejected therefrom.

15. In a cup forming machine the combination of forming dies, means for feeding a web of paper to the dies, said dies including a tubular forming die and a plunger adapted to eject formed cups through said tubular die, and a rotatably mounted wheel provided with a plurality of peripheral tubular pockets adapted to be brought into alinement with the tubular die to receive cups ejected therefrom.

In testimony whereof I have hereunto subscribed my name.

PETER F. BUCHANAN.